Aug. 6, 1957
G. E. LASWELL
2,801,644
AUTOMATIC SAFETY DEVICE FOR INCANDESCENT
LAMP EXHAUST SYSTEMS
Filed April 28, 1953
2 Sheets-Sheet 1
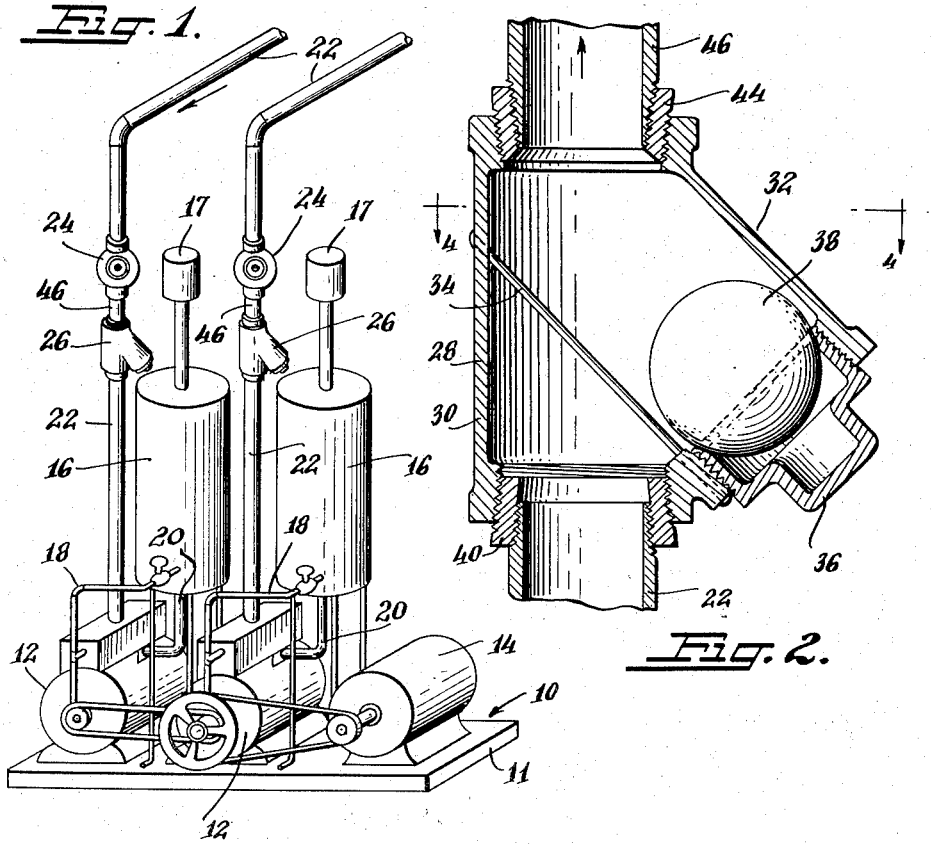
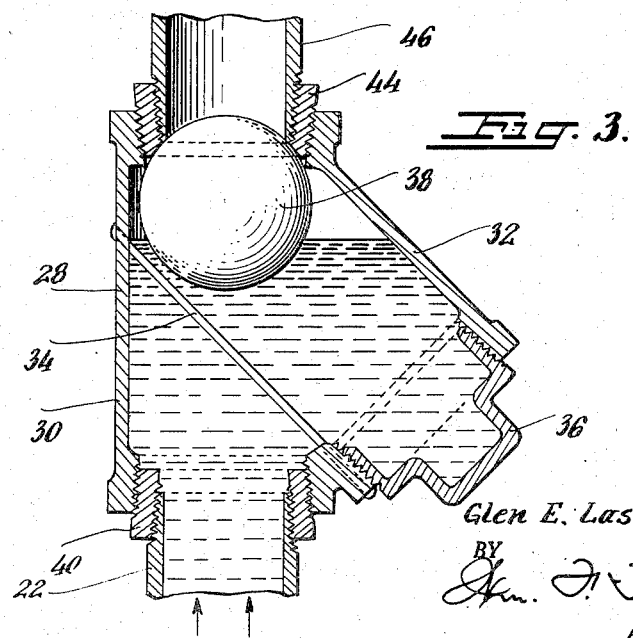
INVENTOR.
Glen E. Laswell
BY
ATTORNEY.

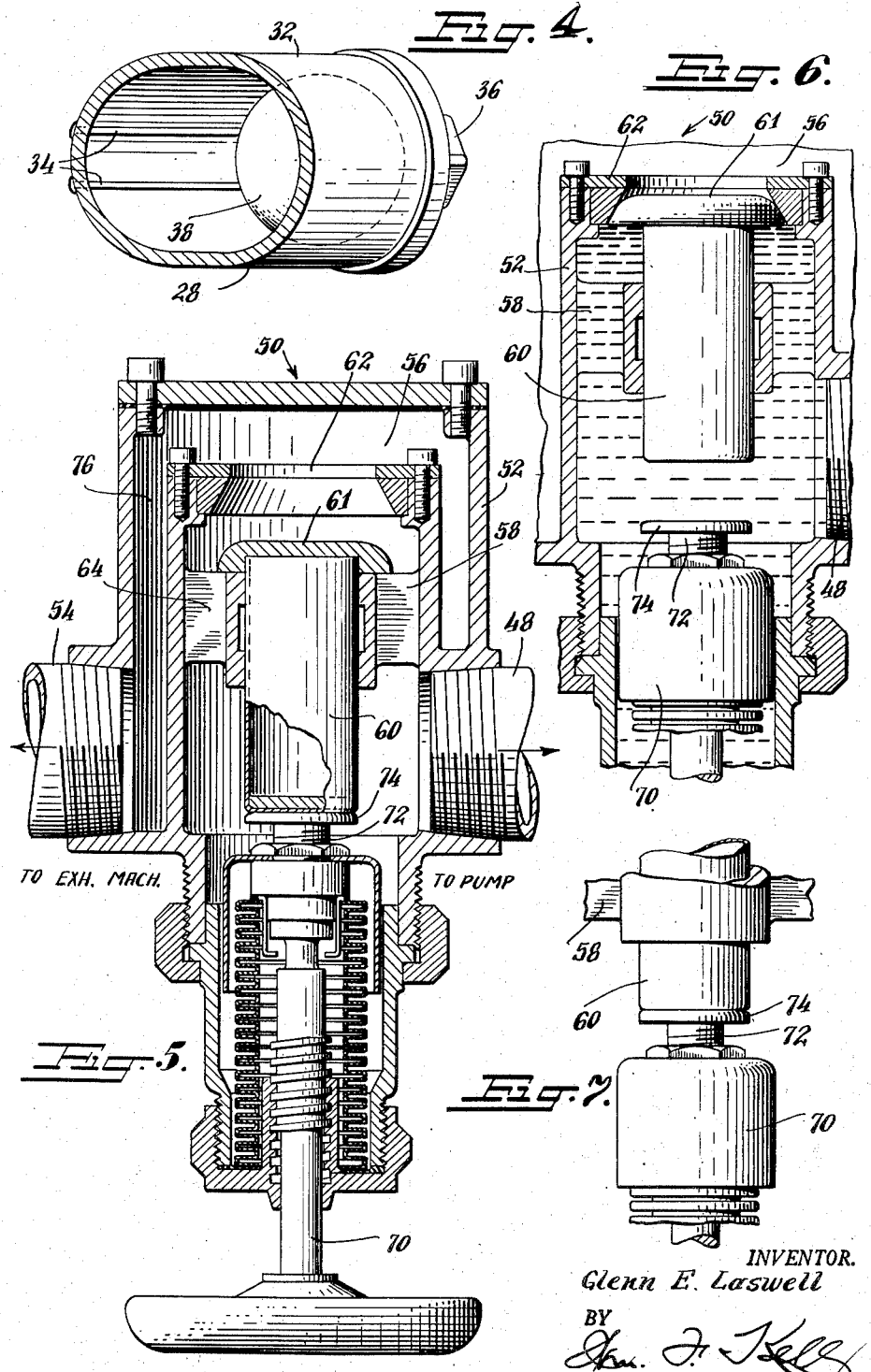

United States Patent Office 2,801,644
Patented Aug. 6, 1957

2,801,644

AUTOMATIC SAFETY DEVICE FOR INCANDESCENT LAMP EXHAUST SYSTEMS

Glenn E. Laswell, Richmond, Ky., assignor to Westinghouse Electric Corporation, East Pittsburgh, Pa., a corporation of Pennsylvania Application April 28, 1953, Serial No. 351,684

2 Claims. (Cl. 137—388)

The present invention relates to an incandescent lamp exhaust system and, more particularly, to an automatic safety device for preventing the flow of a fluid in one direction in the system.

The exhaust system generally employed for an incandescent exhaust machine may comprise an oil tank connected to a motor driven vacuum pump. The oil under atmospheric pressure flows from the tank to the vacuum pump rotor and shaft to form a seal between the rotor and containing cylinder and around the shaft. This oil is then returned to the oil tank by the vacuum pump along with the air or other deleterious gases and vapors being evacuated from the exhaust machine. Within the oil tank, the air and oil are separated and the air is discharged into the atmosphere. If the vacuum pump becomes inoperative while the oil and vacuum lines are open, the oil will continue to flow into the pump, but oil will not be returned by the pump to the tank. The extreme pressure differential between the atmospheric pressure on the oil in the tank and the very low pressure inside the exhaust system, forces the oil up into the vacuum line and eventually floods the exhaust machine.

Failure of the vacuum pump is often caused by breaking of the pump shaft, breaking of the motor belt drive, power failure, motor failure, or negligence of the maintenance man in failing to close the oil and vacuum line valves when shutting off the pumps. The flooding of the exhaust machine with oil results in an expensive reconditioning operation, loss of production and the lowered efficiency of the exhaust machine operators who may be temporarily assigned to unfamiliar work during the reconditioning process.

Hence, it has been found advantageous according to the invention to provide an automatic safety device in the vacuum line connecting the vacuum pump and the exhaust machine, for protecting an incandescent lamp exhaust machine from flooding with vacuum pump oil (while the pump oil line and the vacuum line connecting the pump and the exhaust machine are open), if for any reason the vacuum pump becomes inoperative. The automatic safety device of my invention may comprise a housing provided with a pair of float guide rails, and a float operable on the rails within said housing.

When the oil rises in the line connecting the pump and the exhaust machine (because of the differential between the low pressure in the exhaust machine system and the atmospheric pressure on the oil) to the point where it reaches the automatic safety device of my invention, the oil causes the float to rise from its normal gravitational rest position within the housing to a float seat, where it shuts off the flow of the oil toward the exhaust machine. The float remains seated until the pressure on the opposite side of the float seat is equalized (i. e. the extreme pressure differential which caused the oil to rise, no longer exists).

In its general aspect the present invention has as its objective the elimination of the flooding of an incandescent lamp exhaust machine with pump oil due to failure of the vacuum pump.

A general object of the present invention is an automatic safety device in the vacuum line connecting the vacuum pump and the exhaust machine, for protecting the exhaust machine from flooding with oil from the vacuum pump while the pump remains inoperative.

Other objects of the present invention will become apparent to those skilled in the art to which it appertains, as the description thereof proceeds, both by direct recitation thereof and by implication from the context.

Referring to the drawing in which like numerals of reference indicate similar parts throughout the several views:

Fig. 1 is a perspective view of a vacuum system for an incandescent lamp exhaust machine, incorporating the automatic safety device of the invention.

Fig. 2 is a vertical sectional view of an automatic safety device of my invention shown in its normal gravitational rest position.

Fig. 3 is a view similar to Fig. 2 showing the device of the invention in its operative position.

Fig. 4 is a sectional plan view of the automatic safety device of the invention along the line IV—IV of Fig. 2 in the direction of the arrows.

Fig. 5 is a vertical sectional view of an alternative embodiment of my invention, capable of manual operation, and showing the safety device of the invention in its normal gravitational rest position.

Fig. 6 is a view similar to Fig. 5 showing the alternative embodiment of the automatic safety device in its operative position.

Fig. 7 is a fragmentary view, similar to Fig. 6, showing the manual operation of the alternative embodiment of the automatic safety device.

Referring to the drawing, and particularly to Fig. 1, a vacuum system, incorporating the automatic safety device of the invention, for an incandescent lamp exhaust machine (not shown) is designated by the reference numeral 10. This system 10 may comprise a suitable pedestal 11 on which may be mounted a pair of vacuum pumps 12, a motor 14 for driving the pumps 12, and a pair of oil tanks 16. Each of these tanks 16 may be provided with a suitable air exhaust vent 17. Each tank is connected in the conventional manner to a pump 12 by an oil line 18 having a suitable oil line valve therein and an air and oil exhaust line 20. Each of the pumps 12 may be connected by means of a suitable vacuum line 22 to an incandescent lamp exhaust machine (not shown). This line 22 may be provided with a manual vacuum line valve 24 and has an automatic safety device 26 of the invention between said valve and said pump.

*Preferred embodiment*

The automatic device 26 of my invention, the preferred embodiment of which is shown in Figs. 2, 3 and 4, may comprise an inverted generally V-shaped housing 28 having a vertical air exhaust portion 30 and an inclined float retaining portion 32. As shown in Fig. 4 a pair of guide rails 34 extend diagonally upward from the bottom portion of the float retaining portion 32 parallel to the axis of the portion 32, across the air exhaust portion 30 and have their upper ends secured in the side wall of the air exhaust portion 30. A plug 36 (Figs. 2 and 3) is threadably secured to the lower end of the float retaining portion 32. A spherical hollow float 38, suitably having a specific gravity not greater than 70% of that of the liquid it is to control, rests on the guide rails 34 (Fig. 2). The float 38 may be formed of plastic material or comprise a metallic shell having a plastic coating thereon, and is located at the bottom of the inclined float retaining portion 32 when in its normal gravitational rest position.

The lower portion of the air exhaust portion 30 of the housing 28 may be threadably secured by means of a bushing 40 to the vacuum line 22 of the exhaust machine (not shown). The upper end of the air exhaust portion 30 of the housing 28 is for example threadably secured to a float seat bushing 44. A nipple 46 may connect the seat bushing 44 to the vacuum line valve 24 or to a continuation of the exhaust line 22.

It will be understood that if the oil pumps 12 should cease to operate while the oil lines 18 and 20 and the vacuum line 22 are open, then the oil will continue to flow into the pumps 12 from the oil tanks 16. The oil, of course, will not be returned by the now inoperative pump 12 to the oil tanks 16. The pressure differential between the atmospheric pressure on the oil in the tank and the lower pressure inside the vacuum line 22 and the exhaust machine (not shown) will force the oil upwardly into the vacuum line 22 and into the automatic safety device 26. The oil will cause the float 38 to rise from its normal gravitational rest position (Fig. 2) at the bottom of the float retaining portion 32 (with the aid of the guide rails 34) to the float seat bushing 44 (Fig. 3), where it will shut off the flow of oil toward the exhaust machine. When the pressures on the opposite sides of the float seat 44 become equalized, the oil will recede down the vacuum line 22. The float 38 will move with the aid of the guides 34 to its normal gravitational rest position.

Alternative embodiment

If it becomes expedient to employ the automatic safety device of my invention in a horizontal exhaust line 48, an alternative embodiment of my safety device 50, shown in Figs. 5, 6 and 7, may be employed. This automatic safety device 50 has an annular housing 52 which is threadably connected near its lower right portion (when viewed in Fig. 5) to the horizontal exhaust line 48 and to a continuation 54 of said exhaust line, leading to the exhaust machine (not shown).

The housing 52 is provided with a cup-like inner float retaining chamber 56 having a float guide 58, a hollow cylindrical float 60, and a removable float seat 62 secured to its upper portions. The float 60 carries on its upper end a cap 61 suitably contoured to fit the float seat 62. The guide 58 is provided with vertical oil inlet holes 64 for passage of the oil from the lower portions of the float retaining chamber 56 to the upper portions thereof.

A conventional hand valve 70 may be secured to the bottom portion of the housing 50 for the manual operation of the float 60. An operating plunger 72 of the valve 70 extends through the bottom of the float retaining chamber 56, and carries an operating disc 74 on its upper or inner end for contacting the bottom portion of the float 60.

As the oil enters the float retaining chamber 56 from the exhaust line 48, due to, for example, a failure of the pump, the oil will rise upwardly through the oil discharge holes 64 in the guide 58 and move the float 60 upwardly from its rest position (Fig. 5) on the guide 58 until the float cap 61 engages the float seat 62 (Fig. 6), thus shutting off the flow of oil toward the exhaust machine.

During the shutting-down of the exhaust machine a pump failure is generally not involved. However, it is often expedient to manually move the float 60 upwardly on the guide 58 (Fig. 7) by means of the plunger 72 of the hand valve 70 to seat the float cap 61 against the float seat 62. This precautionary measure prevents subsequent flow of the oil through the float retaining chamber 56, and an air exhaust passage-way 76 provided between the housing 52 and the float retaining chamber 56, to the continuation of the exhaust line 48.

Although a preferred embodiment of my invention has been disclosed, it will be understood that modifications may be made within the spirit and scope of the invention.

I claim:

1. An automatic safety device for preventing the flow of fluid in one direction in a lamp exhaust system comprising a housing having an air exhaust portion, a float retaining portion angularly disposed with respect to and connecting with said air exhaust portion and a float seat in said air exhaust portion, guide means within said float retaining portion, and a float completely retainable within said float retaining portion during exhaust to prevent reduction of the cross section of said air exhaust portion by said float and of exhaust pumping speed through said device, said float being guidable to said float seat by said guide means and said fluid, when said fluid flows in said one direction.

2. A lamp exhaust system comprising an oil tank, a vacuum pump connected to said tank by oil lines and air and oil exhaust lines, a vacuum line connecting said pump to an exhaust machine and an automatic safety device in said vacuum line for preventing the flow of oil from said pump toward said exhaust machine, said device comprising a housing having an air exhaust portion, a float retaining portion angularly disposed with respect to and connecting with said air exhaust portion and a float seat in said air exhaust portion, guide means within said float retaining portion, and a float completely retainable within said float retaining portion during exhaust to prevent reduction of the cross section of said air exhaust portion by said float and of exhaust pumping speed through said device, said float being guidable to said float seat by said guide means and oil when said oil flows in said one direction.

References Cited in the file of this patent

UNITED STATES PATENTS

| | | |
|---|---|---|
| 1,445,811 | Wetmore | Feb. 20, 1923 |
| 1,851,084 | Brown | Mar. 29, 1932 |
| 1,983,891 | Ball | Dec. 11, 1934 |
| 2,344,304 | Hooper | Mar. 19, 1944 |
| 2,393,078 | Wager | Jan. 15, 1946 |
| 2,671,527 | Moon | Mar. 9, 1954 |